(No Model.)
W. C. PENLAND.
PRUNING KNIFE.
No. 255,114. Patented Mar. 21, 1882.
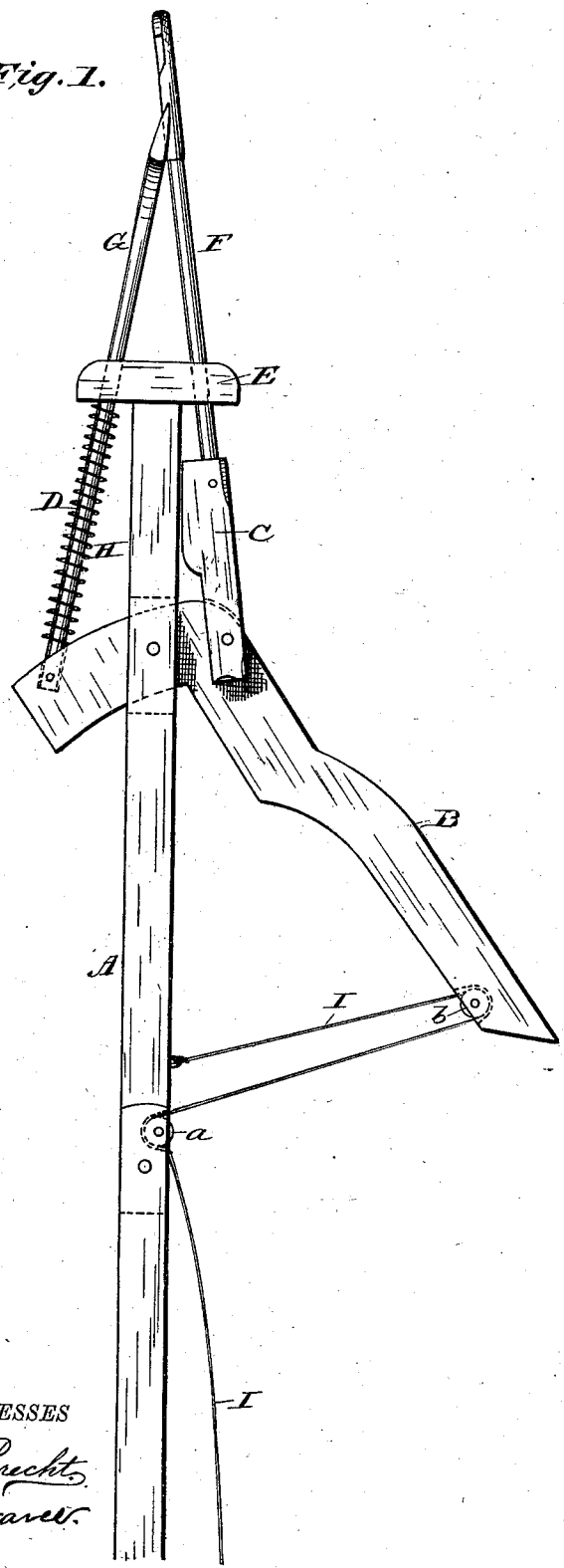
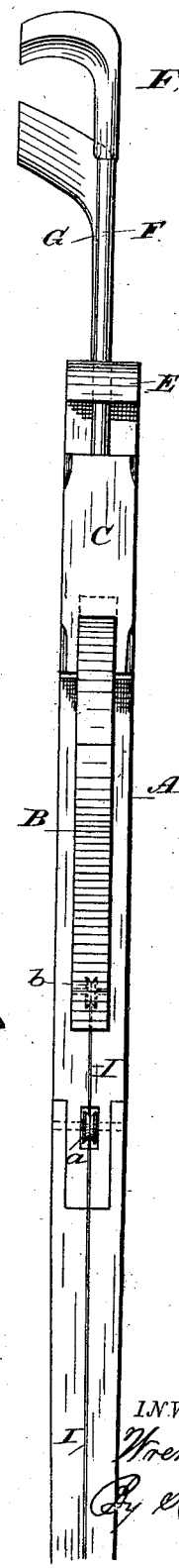
WITNESSES
INVENTOR
Wren C. Penland

United States Patent Office.

WREN C. PENLAND, OF ASHEVILLE, ASSIGNOR OF ONE-HALF TO JAMES M. BROOKSHIER, OF BUNCOMBE COUNTY, NORTH CAROLINA.

PRUNING-KNIFE.

SPECIFICATION forming part of Letters Patent No. 255,114, dated March 21, 1882.

Application filed January 25, 1882. (No model.)

*To all whom it may concern:*

Be it known that I, WREN C. PENLAND, a citizen of the United States, residing at Asheville, in the county of Buncombe and State of North Carolina, have invented certain new and useful Improvements in Pruning-Knives, of which the following is a specification, reference being had therein to the accompanying drawings.

My improvement relates to certain details of construction, which will be hereinafter fully described, and specifically pointed out in the claim.

Referring to the accompanying drawings, forming a part of this specification, Figure 1 is a front, and Fig. 2 is a side, elevation of my device.

Like letters of reference indicate corresponding parts in both of the figures.

A represents a handle, of suitable length, on the top of which is secured a short transverse piece or bar, E, which has angular perforations near each end for the passage of the rods G F, which will be described presently.

At a proper distance from the top of the rod A a sheave, $a$, is mounted in suitable bearings, and closer to the top of the rod A is pivoted the bell-crank lever B. The lever B has at its lower end and on the side toward the handle a sheave, $b$. A short arm, C, bifurcated at its lower end and straddling the lever B, is pivoted to the knee thereof, the inner edge of the short arm C being adjacent to the handle A, as plainly shown in Fig. 1. A rod, D G, is pivoted to the upper free end of the bell-crank lever, and that portion of it between the end of the lever B and the cross-bar E is surrounded by a coiled spring, H. A second rod, F, is mounted in the top of the short arm C, and both rods are passed through the angular perforation in the cross-piece E, and terminate in or have suitable knives or shears secured to their upper ends. The rod F projects some distance farther above the cross-piece E than the rod G, and carries a knife in the form of a hook, so that in operation it will partially surround the branch to be cut.

At a proper distance above the sheave $a$ a screw-eye, hook, or other analogous device is provided, and to this eye or hook is screwed one end of the cord I. This cord is next passed around the sheave $b$ on the bell-crank lever and the sheave $a$ in the handle, and allowed to extend down along the handle a sufficient distance to be reached by the operator.

The operation of my device will be readily apparent without elaborate description. The operator seizes the handle and the cord I, and, placing the knives in such position that the branch to be cut comes between them, pulls on the cord, which draws the lower end of the bell-crank lever toward the handle, and causes the knives to approach each other and sever the branch by pulling down the rod F and raising the rod G. By the operation of the coiled spring the parts then resume their normal relation to each other, ready for a repetition of the operation. The short pivoted arm C, with its inwardly-projecting enlargement leaning against the handle, acts as a guide to keep the knives in close contact with each other.

Having thus fully described my improvement, what I claim is—

A pruning implement consisting of the handle A, provided with the sheave $a$, pivoted bell-crank lever B, having sheave $b$, and perforated cross-bar E, in combination with the pivoted arm C, with inwardly-projecting enlargement, rods D, G, and F, provided with suitable knives, the coiled spring H, and operating-cord I, all constructed and adapted to operate substantially in the manner and for the purpose specified.

In testimony whereof I affix my signature in presence of two witnesses.

WREN C. PENLAND.

Witnesses:
WM. R. WHITSON,
C. W. MALONE.